US011541716B2

(12) United States Patent
Kim et al.

(10) Patent No.: US 11,541,716 B2
(45) Date of Patent: Jan. 3, 2023

(54) AIR CONDITIONER FOR VEHICLE

(71) Applicant: Hanon Systems, Daejeon (KR)

(72) Inventors: Tae Wan Kim, Daejeon (KR); Yong Eun Seo, Daejeon (KR); Jeong Hun Seo, Daejeon (KR); Jong Gon Lee, Daejeon (KR); Myoung Jun Kim, Daejeon (KR); Tae Gun Lee, Daejeon (KR)

(73) Assignee: Hanon Systems, Daejeon (KR)

(*) Notice: Subject to any disclaimer, the term of this patent is extended or adjusted under 35 U.S.C. 154(b) by 389 days.

(21) Appl. No.: 16/550,659

(22) Filed: Aug. 26, 2019

(65) Prior Publication Data

US 2020/0070618 A1 Mar. 5, 2020

(30) Foreign Application Priority Data

Aug. 30, 2018 (KR) .......................... 10-2018-0102504
Jun. 11, 2019 (KR) .......................... 10-2019-0068470

(51) Int. Cl.
*B60H 1/00* (2006.01)

(52) U.S. Cl.
CPC ..... *B60H 1/00028* (2013.01); *B60H 1/00064* (2013.01); *B60H 2001/002* (2013.01); *B60H 2001/00135* (2013.01)

(58) Field of Classification Search
CPC ............ B60H 1/00064; B60H 1/00564; B60H 1/0071; B60H 1/00664; B60H 1/00842;
(Continued)

(56) References Cited

U.S. PATENT DOCUMENTS 5,862,677 A * 1/1999 Kim .................. B60H 1/00064
165/42
6,021,957 A * 2/2000 Takechi ............. B60H 1/00842
165/42
(Continued)

FOREIGN PATENT DOCUMENTS

JP 2004256048 A * 9/2004
JP 4059103 B2 * 3/2008
(Continued)

*Primary Examiner* — Leonard R Leo
(74) *Attorney, Agent, or Firm* — Norton Rose Fulbright US LLP; James R. Crawford

(57) ABSTRACT

Disclosed herein is an air conditioner for a vehicle, which can prevent reduction of an air volume by reducing a back-and-forth width of the vehicle and sufficiently securing the degree of opening of a warm air bypass door, and control an efficient linkage between the warm air bypass door and a defrost door. The air conditioner includes: an air-conditioning case having an air passageway formed therein; a heat exchanger for cooling and a heat exchanger for heating which are disposed in the air passageway of the air-conditioning case to exchange heat with air passing the air passageway; a warm air bypass passageway for directly discharging the air passing the heat exchanger for heating to a front seat floor vent; and a warm air bypass door for adjusting the degree of opening of the warm air bypass passageway, wherein the warm air bypass door includes a rotary shaft and a plate, and the plate has a bent portion to have at least two sides.

24 Claims, 13 Drawing Sheets

(58) Field of Classification Search
CPC .... B60H 2001/00135; B60H 2001/002; B60H 2001/00164
See application file for complete search history.

(56) References Cited

U.S. PATENT DOCUMENTS

| | | | | |
|---|---|---|---|---|
| 6,138,749 | A * | 10/2000 | Kawai | B60H 1/00842 |
| | | | | 165/42 |
| 6,874,575 | B2 * | 4/2005 | Kim | B60H 1/00064 |
| | | | | 165/43 |
| 10,919,360 | B2 * | 2/2021 | Pierres | B60H 1/00564 |
| 11,230,164 | B2 * | 1/2022 | Benamira | B60H 1/00871 |
| 2016/0236535 | A1 * | 8/2016 | Kuwayama | B60H 1/00678 |

FOREIGN PATENT DOCUMENTS

| | | | | | |
|---|---|---|---|---|---|
| JP | 2014198487 | A | | 10/2014 | |
| KR | 2012061216 | A | * | 6/2012 | |
| KR | 101484718 | B1 | | 1/2015 | |
| WO | WO-2007055499 | A1 | * | 5/2007 | ......... B60H 1/00064 |

* cited by examiner

PRIOR ART

PRIOR ART

PRIOR ART (a)　　　　　　(b)　　　　　　(c)

AIR CONDITIONER FOR VEHICLE

This application claims priority from Korean Patent Application Nos. 10-2018-0102504 filed on Aug. 30, 2018, and 10-2019-0068470, filed on Jun. 11, 2019. The entire contents of these applications are incorporated herein by reference in their entirety.

BACKGROUND OF THE INVENTION

Field of the Invention

The present invention relates to an air conditioner for a vehicle, and more particularly, to an air conditioner for a vehicle, which includes an upper flow channel and a lower flow channel to individually control front seat air-conditioning and rear seat air-conditioning of the vehicle.

Background Art

In general, an air conditioner for a vehicle is a car part, which is installed in a vehicle for the purpose of cooling or heating the interior of the vehicle in the summer season or the winter season or removing frost from a windshield in the rainy season or the winter season to thereby secure a driver's front and rear visual fields. Such an air conditioner typically includes a heating device and a cooling device together, so that it can heat, cool or ventilate the interior of the vehicle through the steps of selectively introducing the indoor air or the outdoor air into the air conditioner, heating or cooling the introduced air, and blowing the heated or cooled air into the vehicle.

Korean Patent No. 1484718 (Jan. 21, 2015) discloses an air conditioner for a vehicle which controls positions of a rear seat temp door, an auxiliary rear seat temp door and a rear seat on-off door to regulate an air volume of a rear seat. FIG. 1 is a sectional view of a conventional air conditioner for a vehicle. As shown in FIG. 1, the air conditioner for a vehicle includes an air-conditioning case 10, an evaporator 20, a heater core 30, a front seat temp door 51, and a front seat mode door.

The air-conditioning case 10 includes an air inlet 11 and an air outlet, and an air passageway formed therein. A blower unit is connected to the air inlet 11 so that indoor air or outdoor air is selectively introduced into the air passageway formed inside the air-conditioning case 10. The air outlet includes a defrost vent 12, a face vent 13, a floor vent 14, a rear seat face vent 15, and a rear floor vent 16. The air passageway inside the air-conditioning case 10 includes a front seat cold air passageway P1, a warm air passageway P2, and a rear seat cold air passageway P3.

The evaporator 20 is a heat exchanger for cooling and cools air passing the evaporator 20. The heater core 30 is a heat exchanger for heating and heats air passing the heater core 30. The heater core 30 is arranged in the warm air passageway P2 which is located downstream of the evaporator 20 in an air flow direction. An electric heater 40, such as a PTC heater, may be further disposed in the warm air passageway P2. The front seat temp door 51 is arranged between the evaporator 20 and the heater core 30 in order to adjust the degree of opening of the warm air passageway P2 passing the heater core 30 and the degree of opening of the cold air passageways P1 and P3 bypassing the heater core 30. The front seat mode door includes a defrost door 53, a vent door 54, and a floor door 55.

The rear seat air passageway includes the rear seat cold air passageway P3 that the air passing the evaporator 20 bypasses the heater core 30 and a warm air passageway passing the heater core 30. The warm air passageway of the rear seat air passageway is used together with the warm air passageway P2 of the front seat air passageway. That is, some of air passing the heater core 30 and flowing in the warm air passageway P2 moves upwardly, and then, is discharged to at least one among the defrost vent 12, the face vent 13, and the floor vent 114, and the remainder of the air moves downwardly, and then, is discharged to at least one among the rear seat face vent 15 and the rear seat floor vent 16. A rear seat mode door 58 is disposed in the rear seat air passageway to adjust the degree of opening of the rear seat face vent 15 and the degree of opening of the rear seat floor vent 16.

The air-conditioning case 10 has a rear seat temp door 52, an auxiliary rear seat temp door 56, and a rear seat on-off door 57 which are disposed in the air-conditioning case 10. The rear seat temp door 52 is disposed between the evaporator 20 and the heater core 30 in order to adjust the degree of opening of a passageway flowing to the warm air passageway P2 and a passageway flowing to the rear seat cold air passageway P3. The auxiliary rear seat temp door 56 is arranged downstream of the heater core 30 in the air flow direction in order to adjust the degree of opening of a passageway flowing to the rear seat air outlet. The rear seat on-off door 57 adjusts the degree of opening of the rear seat cold air passageway P3.

FIG. 2 is a view showing a front and rear seat cooling mode of the conventional air conditioner for a vehicle. Referring to FIG. 2, in the front and rear seat cooling mode, the front seat temp door 51 closes the warm air passageway P2 and opens the front seat cold air passageway P1, and the rear seat temp door 52 closes the warm air passageway P2 and opens the rear seat cold air passageway P3. The auxiliary rear seat temp door 56 closes a passageway flowing to the rear seat air outlet, and the rear seat on-off door 57 opens the rear seat cold air passageway P3. The air cooled while passing the evaporator 20 bypasses the heater core 30, and then, some of the air passes through the front seat cold air passageway P1 and is discharged to at least one among the front seat air outlets, and the rest of the air passes through the rear seat cold air passageway P3 and is discharged to at least one among the rear seat air outlets.

FIG. 3 is a view showing a front and rear seat heating mode of the conventional air conditioner for a vehicle. Referring to FIG. 3, in the front and rear seat heating mode, the front seat temp door 51 closes the front seat cold air passageway P1 and opens the warm air passageway P2, and the rear seat temp door 52 closes the rear seat cold air passageway P3 and opens the warm air passageway P2. The auxiliary rear seat temp door 56 opens the passageway flowing to the rear seat air outlet, and the rear seat on-off door 57 closes the rear seat cold air passageway P3. The air passed through the evaporator 20 is heated while passing the heater core 30, and then, some of the heated air moves upwards and is discharged to at least one among the front seat air outlets, and the rest of the heated air moves downwards and is discharged to at least one among the rear seat air outlets.

The conventional air conditioner for a vehicle includes a warm air bypass passageway for directly discharging the air passing the heater core 30 and the electric heater 40 to the floor vent and a warm air bypass door for opening and closing the warm air bypass passageway.

A three-zone air conditioner which controls temperature of three independent zones of the driver's seat, the front passenger's seat, and the rear seat has a problem in that an air volume toward the front seat floor vent is reduced since being disadvantageous to prevention of leak by the warm air bypass door and being disadvantageous to securing the degree of opening of the door if a back-and-forth width of the vehicle is reduced.

A two-zone air conditioner which controls temperature of two independent zones of the front seat and the rear seat has a problem in that it is difficult to configure a duct toward the passenger's feet since an outlet of a front seat floor vent is too low and it is difficult to reduce the back-and-forth width of the vehicle in the same way as the three-zone air conditioner.

PATENT LITERATURE

Patent Documents

Patent Document: Korean Patent No. 1484718 (Jan. 21, 2015)

SUMMARY OF THE INVENTION

Accordingly, the present invention has been made to solve the above-mentioned problems occurring in the prior arts, and it is an object of the present invention to provide an air conditioner for a vehicle which can prevent reduction of an air volume by reducing a back-and-forth width of the vehicle and sufficiently securing the degree of opening of a warm air bypass door, and control an efficient linkage between the warm air bypass door and a defrost door.

To accomplish the above object, according to the present invention, there is provided an air conditioner for a vehicle including an air-conditioning case having an air passageway formed therein; a heat exchanger for cooling and a heat exchanger for heating which are disposed in the air passageway of the air-conditioning case to exchange heat with air passing the air passageway; a warm air bypass passageway for directly discharging the air passing the heat exchanger for heating to a front seat floor vent; and a warm air bypass door for adjusting the degree of opening of the warm air bypass passageway, wherein the warm air bypass door includes a rotary shaft and a plate, and the plate has a bent portion to have at least two sides.

The plate has the two sides inclined on the basis of the bent portion.

The warm air bypass passageway is formed in a partition wall for separating a warm air passageway from the front seat floor vent.

The rotary shaft of the warm air bypass door is formed above an outlet of the front seat floor vent.

A passageway facing the front seat floor vent includes a first passageway arranged upstream from the rotary shaft of the warm air bypass door and a second passageway arranged downstream from the rotary shaft, and the second passageway is larger in cross-sectional area than the first passageway.

The rotary shaft of the warm air bypass door is vertically arranged above the center of the heat exchanger for heating, and the front seat floor vent is vertically arranged below the center of the heat exchanger for heating.

The partition wall includes a first partition wall for separating the warm air passageway from the first passageway and a second partition wall for separating the warm air passageway from the second passageway, and a width between the rear surface of the air-condition case and the second partition wall is wider than a width between the rear surface of the air-conditioning case and the first partition wall, and the front seat floor vent is formed in the second passageway.

The warm air bypass door includes an intensity strengthening rib, and the intensity strengthening rib is formed at the opposite side to an air introducing part of the warm air bypass passageway.

In another aspect of the present invention, there is an air conditioner for a vehicle including: an air-conditioning case having an air passageway formed therein; a heat exchanger for cooling and a heat exchanger for heating which are disposed in the air passageway of the air-conditioning case to exchange heat with air passing the air passageway; a warm air bypass passageway for directly discharging the air passing the heat exchanger for heating to a front seat floor vent; a warm air bypass door for adjusting the degree of opening of the warm air bypass passageway; and a control unit for linking and controlling a defrost door, which adjusts the degree of opening of a defrost vent, and the warm air bypass door.

An opening direction of the warm air bypass door is opposite to an air flow direction.

The opening direction of the warm air bypass door is a direction to face the heat exchanger for heating.

The warm air bypass door blocks a flow channel of the warm air passageway when the warm air bypass passageway is opened, so as to guide some of the air flowing in the warm air passageway toward the front seat floor vent.

The air conditioner further includes: a front seat temp door for adjusting the degree of opening between a front seat cold air passageway and a part of the warm air passageway; a first rear seat temp door arranged between the heat exchanger for cooling and the heat exchanger for heating to adjust the degree of opening of another part of the warm air passageway; a rear seat mode door for adjusting the degree of opening of a rear seat air outlet; and a second rear seat temp door arranged downstream of the heat exchanger for heating to adjust the degree of opening between the warm air passageway and the rear seat cold air passageway.

The air conditioner further includes an upper flow channel and a lower flow channel for individually controlling air-conditioning of the front seat and the rear seat of the vehicle.

The control unit controls to differently compensate the degree of opening of the defrost door depending on opening or closing conditions of the warm air bypass door.

The control unit controls the warm air bypass door to open the warm air bypass passageway only when the driver's seat and the passenger's seat are all in the maximum heating state and the driver's seat and the passenger's seat are all in the front seat floor mode.

The control unit controls the degree of opening of the defrost door in the opening condition of the warm air bypass door to be more than that in the closing condition.

The warm air bypass door has a stopper part formed on the rotary shaft to perform sealing between the warm air bypass door and the air-conditioning case.

The stopper part is formed in the opposite side to the air introducing part of the warm air bypass passageway and does not protrude into the air passageway.

A stepped portion is formed on the partition wall for separating the warm air passageway from the front seat floor vent so that the stopper part is seated on the stepped part when the warm air bypass door is rotated.

The air conditioner for a vehicle according to the present invention can prevent reduction of an air volume, reduce a back-and-forth width of the vehicle, and control an efficient linkage between the warm air bypass door and the defrost door, thereby enhancing air-conditioning performance.

Additionally, the air conditioner for a vehicle according to the present invention can relatively maximize the outlet of the front seat floor vent, enhance heating performance by forming a route of warm air in a straight line, and reduce the back-and-forth width of the air-conditioning case. In addition, the air conditioner for a vehicle according to the present invention strengthen intensity of the warm air bypass door and minimize interruption to an air flow.

BRIEF DESCRIPTION OF THE DRAWINGS

The above and other objects, features and advantages of the present invention will be apparent from the following detailed description of the preferred embodiments of the invention in conjunction with the accompanying drawings, in which.

DETAILED DESCRIPTION OF THE PREFERRED EMBODIMENT

Hereinafter, with reference to the attached drawings, technical structure and configuration of an air conditioner for a vehicle according to a preferred embodiment of the present invention will be described in detail.

Figure 1:
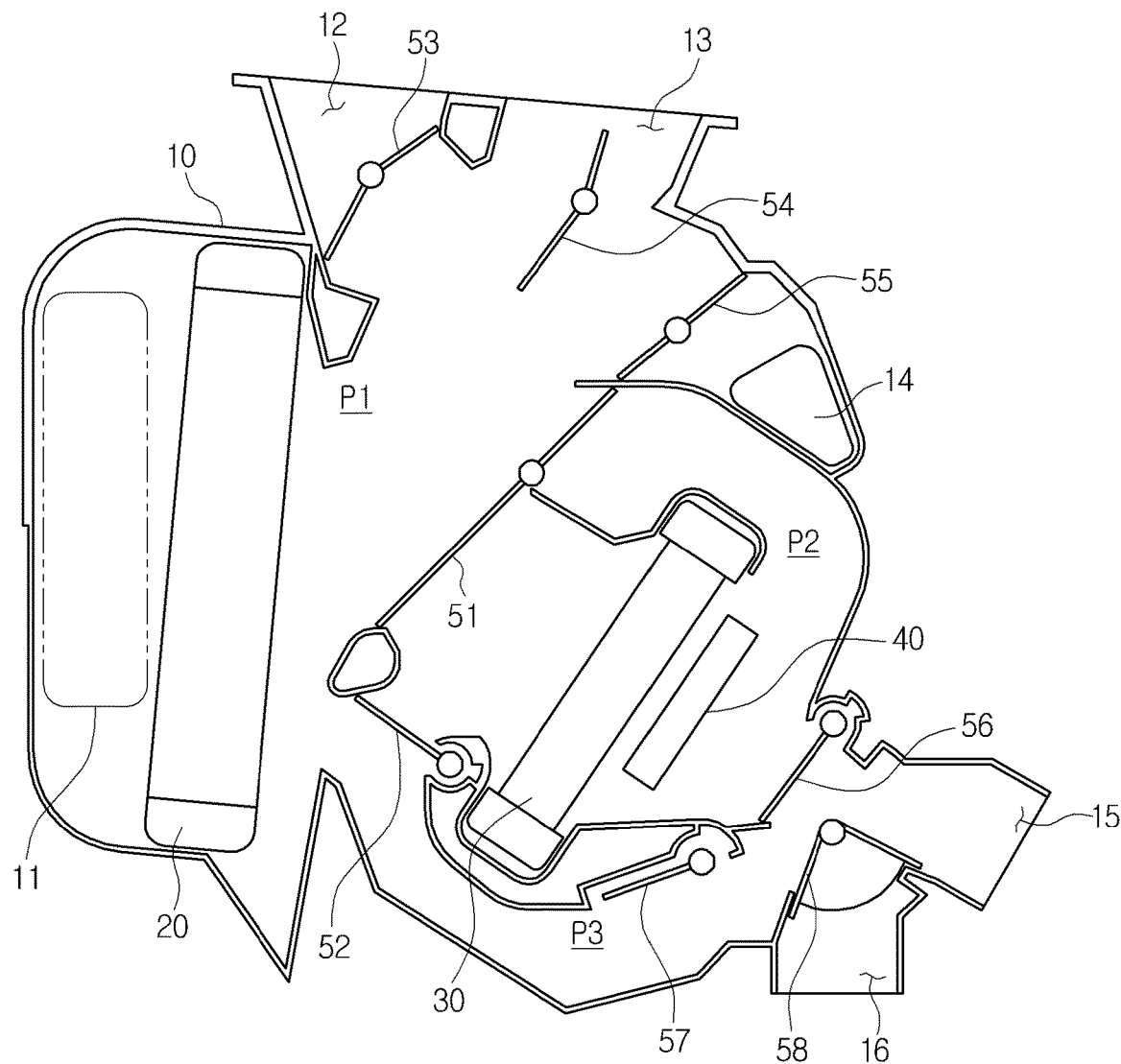
FIG. 1 is a sectional view of a conventional air conditioner for a vehicle.
Figure 2:
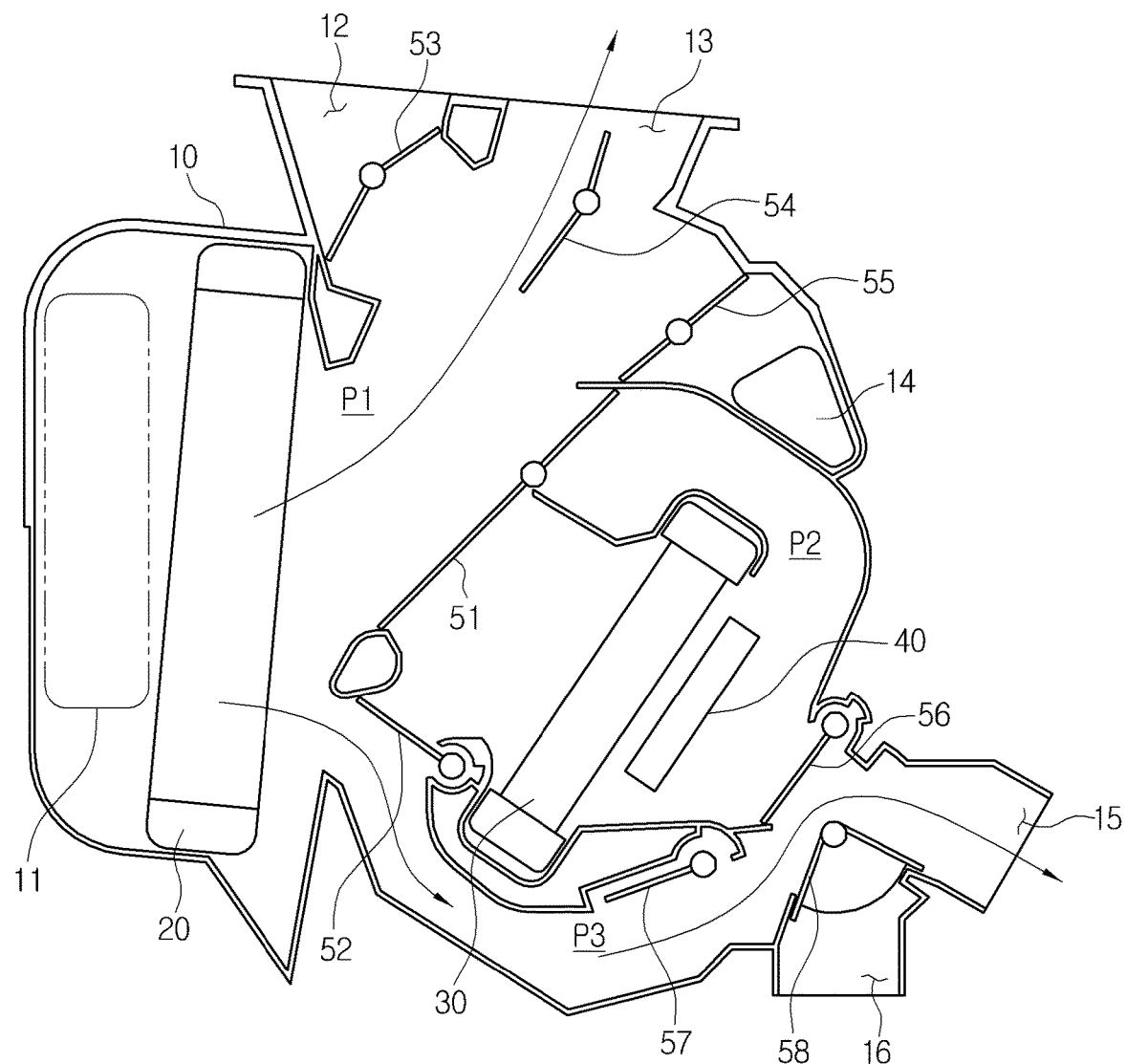
FIG. 2 is a view showing a front and rear seat cooling mode of the conventional air conditioner for a vehicle.
Figure 3:
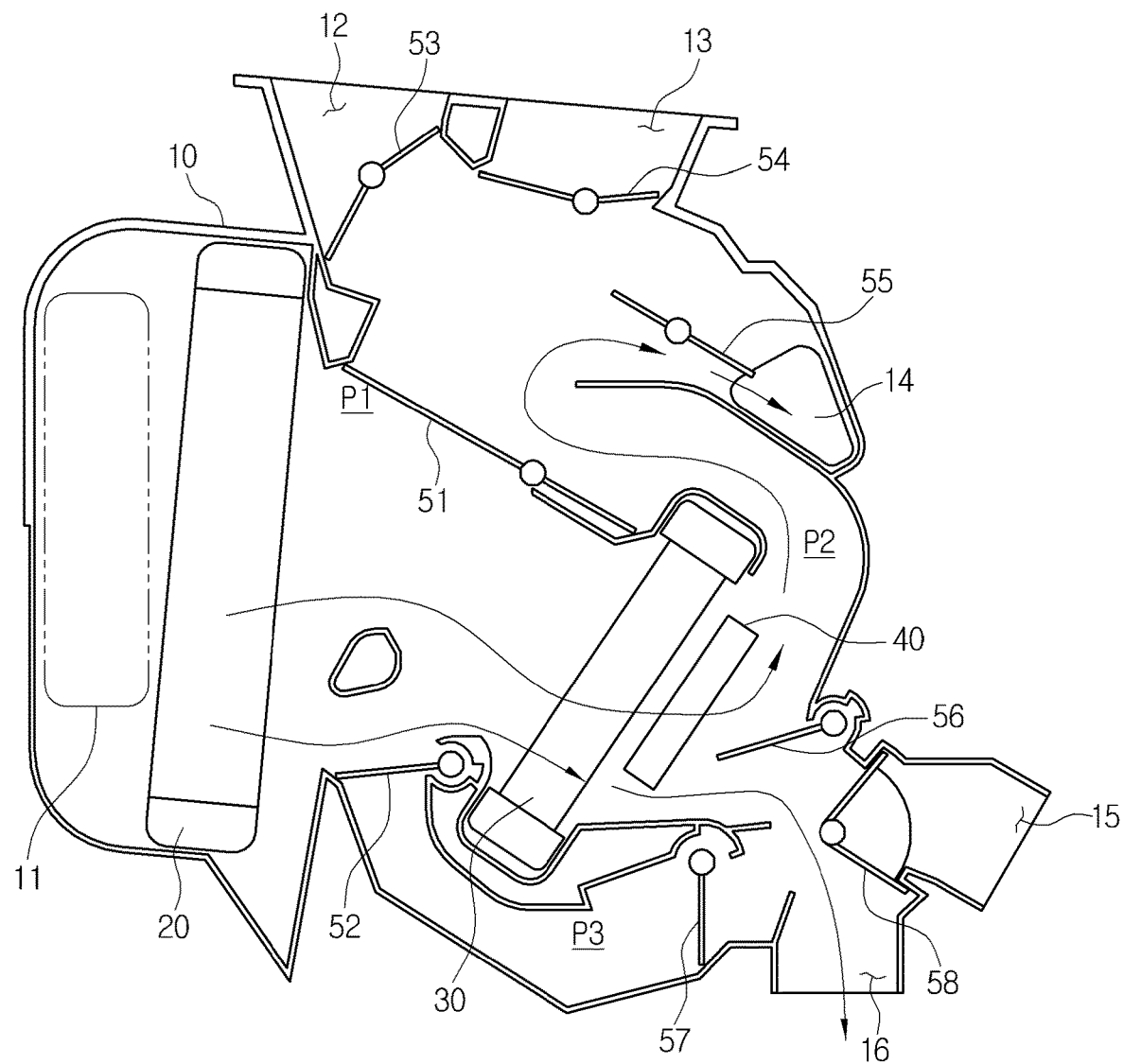
FIG. 3 is a view showing a front and rear seat heating mode of conventional air conditioner for a vehicle.
Figure 4:
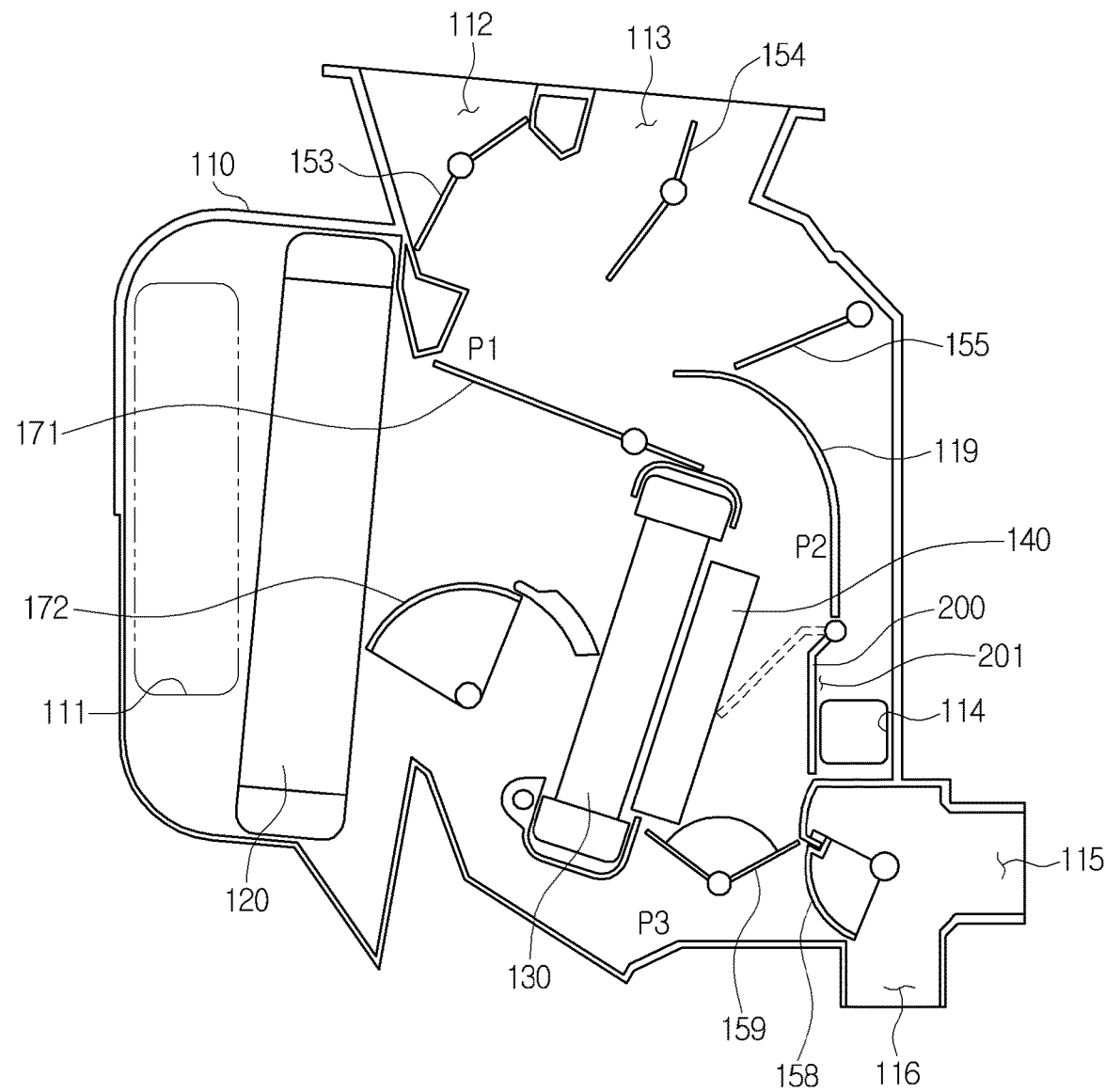
FIG. 4 is a sectional view of an air conditioner for a vehicle according to a first preferred embodiment of the present invention.
Figure 5:
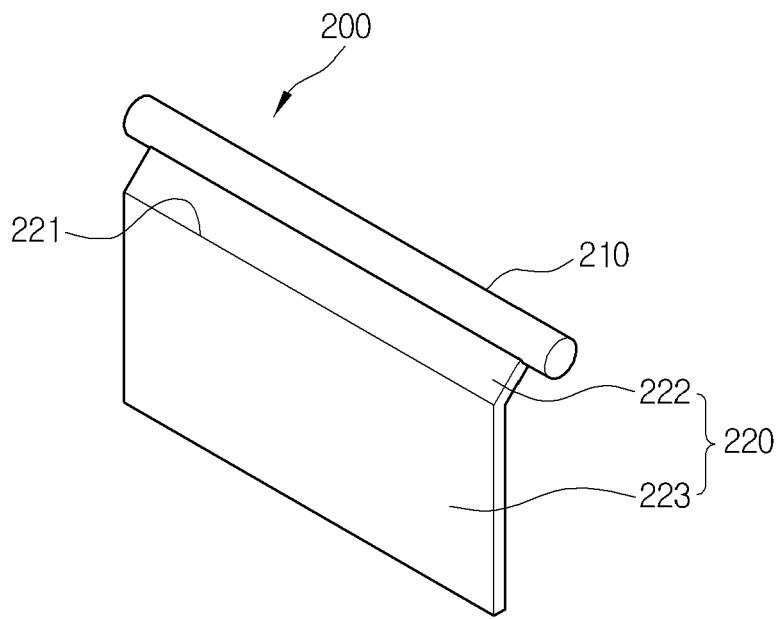
FIG. 5 is a perspective view showing a warm air bypass door according to the first preferred embodiment of the present invention.
Figure 6:
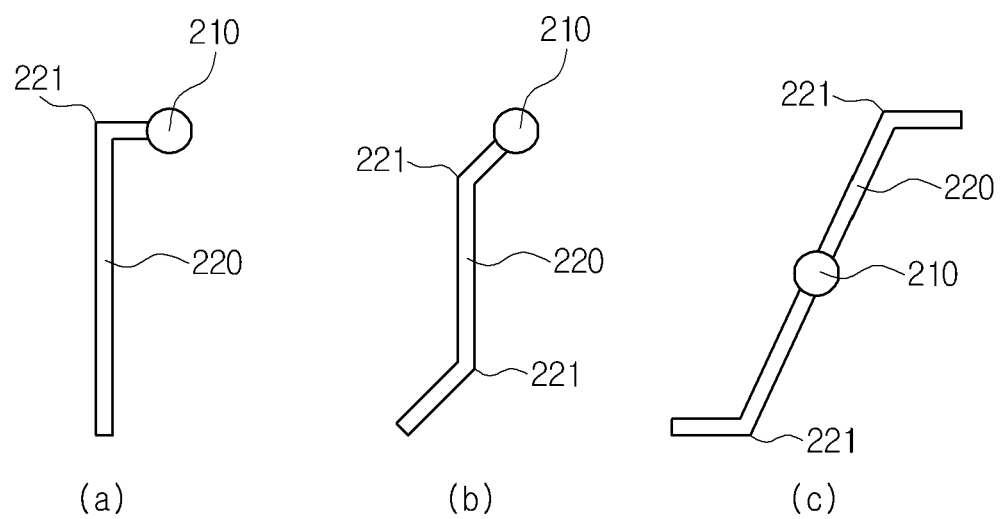
FIG. 6 is a side view showing a warm air bypass door according to a modification of the present invention.
Figure 7:
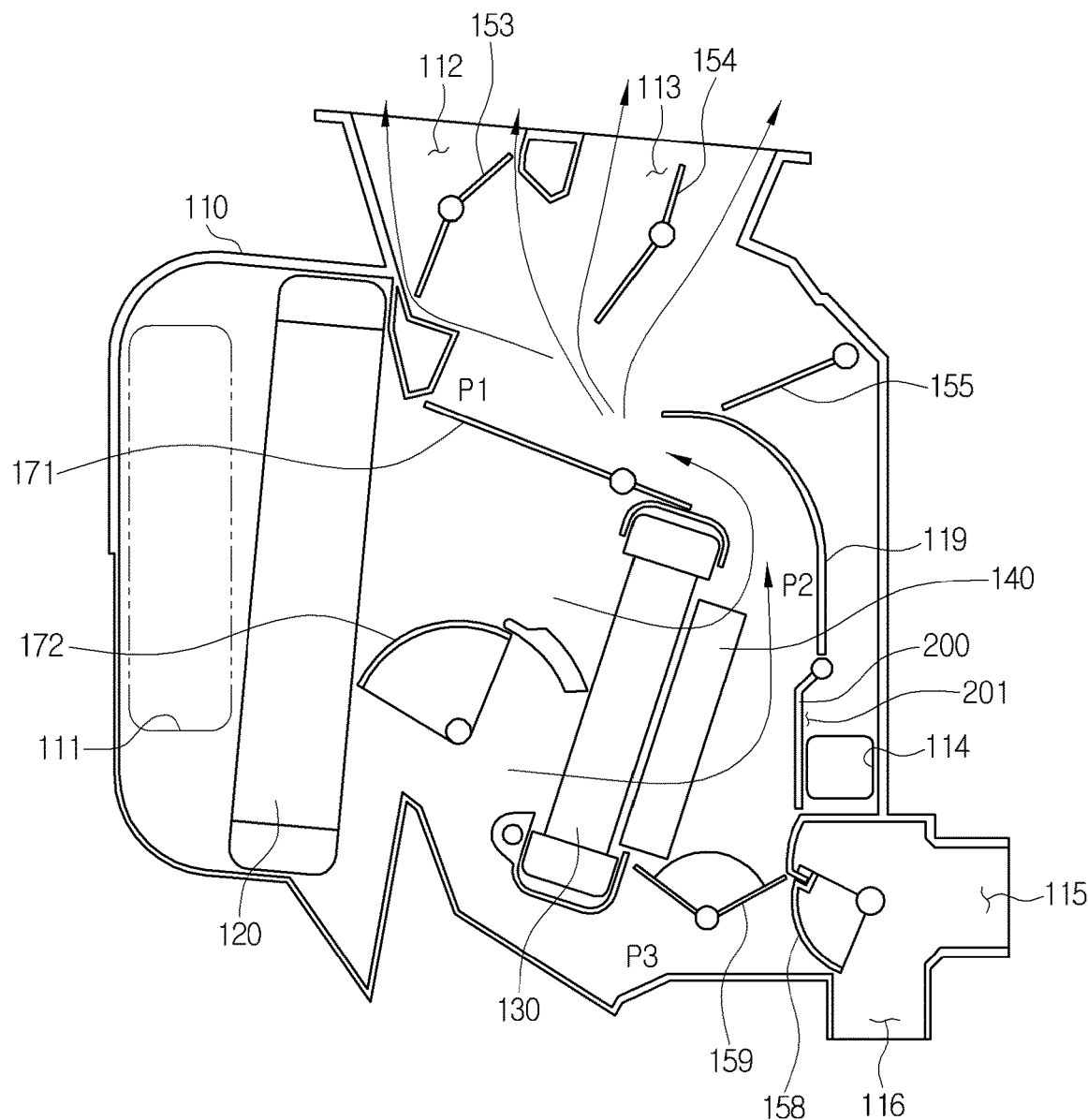
FIGS. 7 and 8 are sectional views showing an operation of the air conditioner for a vehicle according to the first preferred embodiment of the present invention.
Figure 8:
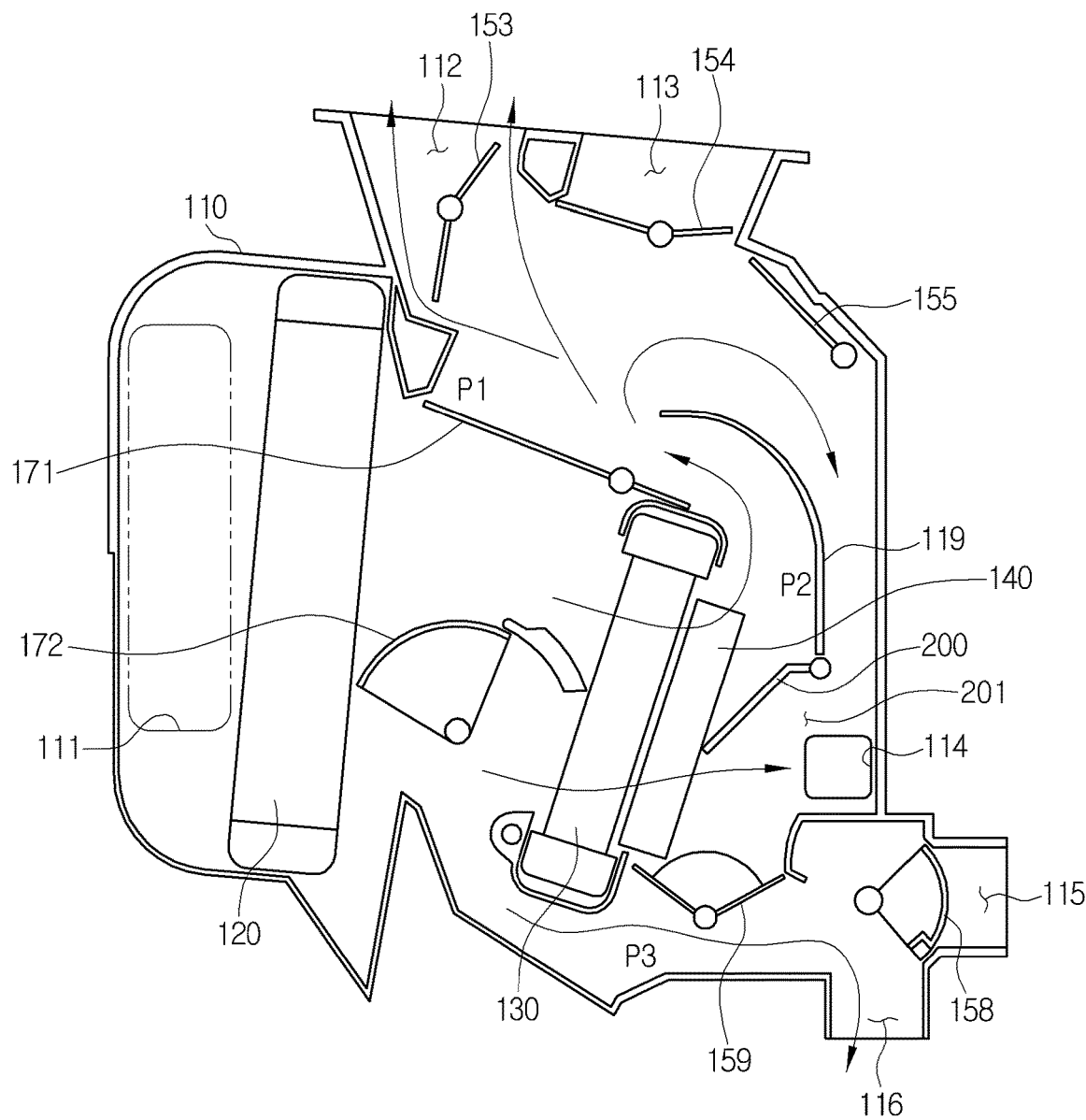

FIG. 4 is a sectional view of an air conditioner for a vehicle according to a first preferred embodiment of the present invention, FIG. 5 is a perspective view showing a warm air bypass door according to the first preferred embodiment of the present invention, FIG. 6 is a side view showing a warm air bypass door according to a modification of the present invention, and FIGS. 7 and 8 are sectional views showing an operation of the air conditioner for a vehicle according to the first preferred embodiment of the present invention.

As shown in FIGS. 4 to 8, the air conditioner for a vehicle according to the preferred embodiment of the present invention includes: an air-conditioning case 110 having an air passageway formed therein; and a heat exchanger for cooling and a heat exchanger for heating disposed in the air passageway of the air-conditioning case 110 to exchange heat with air passing the air passageway. The air conditioner for a vehicle includes an upper flow channel and a lower flow channel for individually controlling air-conditioning of a front seat and a rear seat of the vehicle.

The air-conditioning case 110 includes an air inlet 111, air outlets, and the air passageway formed therein. A blower unit is connected to the air inlet 111 so that indoor air or outdoor air are selectively introduced into the air passageway of the air-conditioning case 110. The air outlets are a front seat air outlet having a defrost vent 112, a front seat face vent 113 and a front seat floor vent 114, and a rear seat air outlet having a rear seat face vent 115 and a rear seat floor vent 116.

The heat exchanger for cooling is an evaporator 120. The evaporator 120 cools air by exchanging heat between refrigerant flowing in the evaporator 120 and air passing the evaporator 120. The heat exchanger for heating is a heater core 130. The heater core 130 heats air by exchanging heat between cooling water flowing in the heater core 130 and air passing the heater core 130. The heater core 130 is arranged in a warm air passageway P2, which is located downstream of the evaporator 120 in an air flow direction. An electric heater 140, such as a PTC heater, may be further disposed in the warm air passageway P2.

The air passageway in the air-conditioning case 110 includes a front seat cold air passageway P1, a warm air passageway P2, and a rear seat cold air passageway P3. The air passageway downstream of the evaporator 120 is divided into the front seat cold air passageway P1, the warm air passageway P2, and the rear seat cold air passageway P3. The front seat cold air passageway P1, the warm air passageway P2, and the rear seat cold air passageway P3 are formed in order from top to bottom, and the warm air passageway P2 formed vertically is arranged between the front seat cold air passageway P1 and the rear seat cold air passageway P3.

The air passing the evaporator 120 flows to the front seat cold air passageway P1 and the rear seat cold air passageway P3 after bypassing the heater core 130 of the warm air passageway P2 to, or joins the front seat cold air passageway P1 or the rear seat cold air passageway P3. The front seat cold air passageway P1 is a passage that the air passing the evaporator 120 flows toward the front seat of the vehicle after bypassing the heater core 130. The rear seat cold air passageway P3 is a passage that the air passing the evaporator 120 flows toward the rear seat of the vehicle after bypassing the heater core 130. The warm air passageway P2 is a passage that the air passing the evaporator 120 flows toward the front seat or the rear seat of the vehicle after passing the heater core 130.

The air-conditioning case 110 has a front seat air outlet for discharging air toward the front seat of the vehicle, and the front seat air outlet is controlled in the degree of opening by a front seat mode door. The front seat mode door includes a defrost door 153 for adjusting the degree of opening of the defrost vent 112, a vent door 154 for adjusting the degree of opening of the front seat face vent 113, and a floor door 155 for adjusting the degree of opening of the front seat floor vent 114. Moreover, the air-conditioning case 110 has a rear seat air outlet for discharging air toward the rear seat of the vehicle, and the rear seat air outlet is controlled in the degree of opening by the rear seat mode door 158.

The air conditioner for a vehicle has a front seat temp door 171. The front seat temp door 171 adjusts the degree of opening between a part of the front seat cold air passageway P1 and a part of the warm air passageway P2. The front seat temp door 171 is adjacent to downstream of the evaporator 120 and is located at a boundary where the front seat cold air passageway P1 and the warm air passageway P2 branch off. The front seat temp door 171 is a tail door having plate members formed at both sides around a rotary shaft in a radial direction.

That is, the front seat temp door 171 has a rotary shaft, a first door part, and a second door part. The rotary shaft of the front seat temp door 171 is mounted adjacent to a lower end of an outlet of the warm air passageway P2. The first door part is formed at one side around the rotary shaft to adjust the degree of opening of upper parts of inlets of the cold air passageway P1 and the warm air passageway P2. The second door is formed at the other side around the rotary shaft to adjust the degree of opening of a front seat outlet of the warm air passageway P2.

The air conditioner for a vehicle according to the first preferred embodiment of the present invention is to control temperature of three independent zones of the driver's seat, the front passenger's seat, and the rear seat, and includes three doors for controlling temperature of the rear seat. That is, the air conditioner for a vehicle includes a first rear seat temp door 172, a second rear seat temp door 159, and the rear seat mode door 158.

The first rear seat temp door 172 is arranged between the evaporator 120 and the heater core 130 to adjust the degree of opening of the other part of the warm air passageway P2. That is, the first rear seat temp door 172 adjusts the degree of opening of a lower part of an inlet of the warm air passageway P2 which is not covered by the front seat temp door 171.

The second rear seat temp door 159 is arranged downstream of the heater core 130, and adjusts the degree of opening of the warm air passageway P2 and the rear seat cold air passageway P3. The second rear seat temp door 159 is a dome door type. The warm air passageway P2 and the rear seat cold air passageway P3 downstream of the heater core 130 are communicated with each other. The second rear seat temp door 159 is arranged in a communication path between the warm air passageway P2 and the rear seat cold air passageway P3 downstream of the heater core 130. That is, the second rear seat temp door 159 adjusts the degree of opening of the communication path between the warm air passageway P2 and the cold air passageway P3 and the rear seat cold air passageway P3.

The rear seat mode door 158 is arranged downstream of the second rear seat temp door 159 to adjust the degree of opening of the rear seat air outlet. The rear seat mode door 158 is a dome-shaped door. The rear seat mode door 158 adjusts the degree of opening between the rear seat air passageway, the console vent 115, and the rear seat floor vent 116.

The air conditioner for a vehicle controls temperature of the rear seat using the first rear seat temp door 172 and the second rear seat temp door 159. Furthermore, the air conditioner for a vehicle controls opening (on) and closing (off) of the rear seat air passageway using the rear seat mode door 158. As described above, compared with the conventional air conditioner, the air conditioner for a vehicle according to the present invention can realize a three-zone air conditioner which can reduce the number of doors and perform control of the rear seat air-conditioning smoothly. Therefore, the air conditioner for a vehicle according to the present invention can reduce the number of the components, manufacturing costs, and weight and volume of the air conditioner.

The first rear seat temp door 172 is a dome-shaped door. The first rear seat temp door 172 is located to close the warm air passageway P2 under the condition of the maximum cooling mode, and is located to partition the evaporator 120 and the heater core 130 under the condition of the maximum heating mode.

The first rear seat temp door 172 is formed to always open the rear seat cold air passageway P3. That is, the first rear seat temp door 172 does not perform the on-off action of the rear seat cold air passageway P3 but performs the opening and closing function of the warm air passageway P2 and an air guiding function in order to enhance performance of the heater core. Furthermore, the on-off action of the rear seat cold air passageway P3 is performed by the rear seat mode door 158, so that the air conditioner can reduce the number of doors and smoothly perform the on-off action for the rear seat air-conditioning.

In the meantime, the first rear seat temp door 172 and the second rear seat temp door 158 are controlled to adjust temperature of the rear seat. That is, in the maximum cooling mode, the first rear seat temp door 172 closes the warm air passageway P2, and the second rear seat temp door 159 closes the communication path between the warm air passageway P2 and the rear seat cold air passageway P3 downstream of the heater core 130. Moreover, in the maximum heating mode, the dome-shaped inner face of the first rear seat temp door 172 is located to guide air toward the warm air passageway P2, and the second rear seat temp door 159 is located to close the rear seat cold air passageway P3. Furthermore, in the mixing mode, the dome-shaped inner face of the first rear seat temp door 172 is located to guide the air toward the warm air passageway P2, and the second rear seat temp door 159 is located between the communication path between the warm air passageway P2 and the rear seat cold air passageway P3 downstream of the heater core 130 and the rear seat cold air passageway P3.

The air conditioner for a vehicle according to the present invention includes a warm air bypass passageway 201 and a warm air bypass door 200. The air passing the heater core 130 and the electric heater 140 is directly discharged to the front seat floor vent 114 by the warm air bypass passageway 201. The warm air bypass passageway 201 is formed in a partition wall 119 for separating the warm air passageway P2 from the front seat floor vent 114. Because the air passing the heater core 130 through the warm air bypass passageway 201 is directly discharged to the front seat floor vent 114, it is expected to enhance heating performance.

The warm air bypass door 200 adjusts the degree of opening of the warm air bypass passageway 201. The warm air bypass door 200 includes a rotary shaft 210 and a plate 220. The rotary shaft 210 is rotatably connected to the air-conditioning case 110, and the plate 220 which is formed in a relatively thin and wide plate shape extends from the rotary shaft 210 in a radial direction. The plate 220 has a bent portion 221 to have at least two sides.

As described above, the warm air bypass door 200 which has the two sides to have a stepped portion can secure the degree of opening of the door and secure a cross-sectional area of the outlet of the front seat floor vent 114. Finally, the air conditioner for a vehicle can prevent reduction of an air volume by securing the degree of opening of the door and reduce the back-and-forth width of the vehicle. In the above, the back-and-forth width of the vehicle is a right and left direction in FIG. 4.

The rotary shaft 210 of the warm air bypass door 200 is formed above the outlet of the front seat floor vent 114. That is, the air conditioner for a vehicle can secure the cross-sectional area of the outlet of the front seat floor vent since the rotary shaft 210 which is a pivot shaft is arranged to be higher than the outlet of the front seat floor vent 114.

Moreover, due to the structure that the rotary shaft 210 is located at an upper part and the plate 220 is rotated below the rotary shaft 210, the air passing the lower portion of the heater core 130 is guided by the warm air bypass door 200 so as to be discharged to the front seat floor vent 114 more smoothly. Because such a structure is similar to the structure that the rotary shaft 210 is located below the plate 220, the air conditioner for a vehicle is advantageous to securing the air volume since the warm air bypass door 200 does not act as an air resistor.

The plate 220 has the two sides inclined on the basis of the bent portion 221. Such an inclined structure is advantageous to space reduction of the warm air bypass door not only in the back-and-forth direction but also in the vertical direction of the vehicle. That is, as shown in FIG. 5, the plate 220 includes a first side 222 extending from the rotary shaft 210, a second side 223 extending from the first side 222, and the bent portion 221 formed between the first side 222 and the second side 223. The first side 222 and the second side 223 are inclined at an obtuse angle.

The warm air bypass door 200 has the plate 220 which is bent at right angles as shown in FIG. 6, has the plate 220 having two bend portions to have three inclined sides, or has the plate 220 extending to both sides of the rotary shaft 210.

An opening direction of the warm air bypass door 200 is opposite to an air flow direction. That is, the opening direction of the warm air bypass door 200 faces the heat exchanger for heating.

As described above, when the opening direction of the warm air bypass door 200 faces the heater core 130, a closing direction of the warm air bypass door 200 is in line with the air flow direction so as to prevent air leak in a state where the warm air bypass door 200 closes the warm air bypass passageway 201. If the opening direction of the warm air bypass door 200 is in the opposite direction to the heater core 130, the closing direction of the warm air bypass door 200 is opposite to the air flow direction, so there may occur an air leak since the warm air bypass door 200 receives power in the direction that the warm air bypass door 200 is opened by air pressure in the state where the warm air bypass door 200 closes the warm air bypass passageway 201.

When the warm air bypass door 200 opens the warm air bypass passageway 201 to the maximum, an end portion of the plate 220 of the warm air bypass door 200 touches the electric heater 140 or gets adjacent to the electric heater 140. If there is no electric heater 140, rotation of the warm air bypass door 200 is controlled such that the end portion of the plate 220 of the warm air bypass door 200 touches the heater core 130 or gets adjacent to the heater core 130.

When the warm air bypass door 200 opens the warm air bypass passageway 201, the flow channel of the warm air passageway P2 is blocked, so that some of the air flowing in the warm air passageway P2 is guided toward the front seat floor vent 114. Therefore, the air conditioner for a vehicle may enhance heating performance by increasing a warm air amount discharged to the front seat floor vent 114.

Furthermore, the air conditioner for a vehicle includes a control unit. The control unit links and controls the defrost door 153 and the warm air bypass door 200. The control unit controls to differently compensate the degree of opening of the defrost door 153 depending on opening or closing conditions of the warm air bypass door 200. In this instance, the defrost door 153 and the warm air bypass door 200 are linked with the control unit through a link or through actuators.

In detail, the control unit controls the warm air bypass door 200 to open the warm air bypass passageway In detail, the control unit controls the warm air bypass door 200 to open the warm air bypass passageway only when the driver's seat and the passenger's seat are all in the maximum heating state and the driver's seat and the passenger's seat are all in the front seat floor mode. In more detail, the control unit controls the degree of opening of the defrost door in the opening condition of the warm air bypass door 200 to be more than that in the closing condition.

When the warm air bypass door 200 is opened, the warm air bypass door 200 blocks a part of the flow channel of the warm air passageway P2 so that the air volume toward the defrost vent 112 is reduced. Therefore, when the warm air bypass door 200 is opened, the control unit controls to compensate the degree of opening of the defrost vent 112 more so as to supplement the reduction of the air volume toward the defrost vent 112.

TABLE 1

| Air-conditioning mode | Defrost door opening degree | Warm air bypass door state |
|---|---|---|
| First front seat floor mode | A | Opened |
| Second front seat floor mode | B | Closed |

Referring to Table 1, the first front seat floor mode is the case that the driver's seat temp door and the passenger's seat temp door are all in the maximum heating section and the driver's seat and the passenger's seat are all in the front seat floor mode. In the first front seat floor mode, the warm air bypass door 200 is opened and the degree of opening of the defrost door is set as A. In the meantime, the second front seat floor mode is not the first front seat floor mode, and does not satisfy any of cases that the driver's seat temp door is in the maximum heating section, that the passenger's seat temp door is in the maximum heating section, that the driver's seat is in the front seat floor mode, and that the passenger's seat is in the front seat floor mode. In the second front seat floor mode, the warm air bypass door 200 is closed, and the degree of opening of the defrost door is set as B. In this instance, the degree of opening (A) of the defrost door when the warm air bypass door is opened is set to be larger than the degree of opening (B) of the defrost door when the warm air bypass door is closed. If an air flow distribution of the defrost vent when the warm air bypass door 200 is opened is within a range of ±5%, a value of the degree of opening (A) and a value of the degree of opening (B) may be the same.

For instance, as shown in FIG. 7, when the warm air bypass door 200 closes the warm air bypass passageway 201, the air passing the heater core 130 is discharged to the front seat face vent 113, and some of the air is discharged to the defrost vent 112. As shown in FIG. 8, when the warm air bypass door 200 opens the warm air bypass passageway 201, the air passing the heater core 130 is directly discharged to the front seat floor vent 114, and some of the air is discharged to the defrost vent 112. In this instance, the rear seat is in the maximum heating state, the first rear seat temp door 172 is operated, and the rear seat mode door 158 opens the rear seat floor vent 116. The degree of opening of the defrost door 113 shown in FIG. 8 is larger than the degree of opening of the defrost door 113 shown in FIG. 7.

Figure 9:
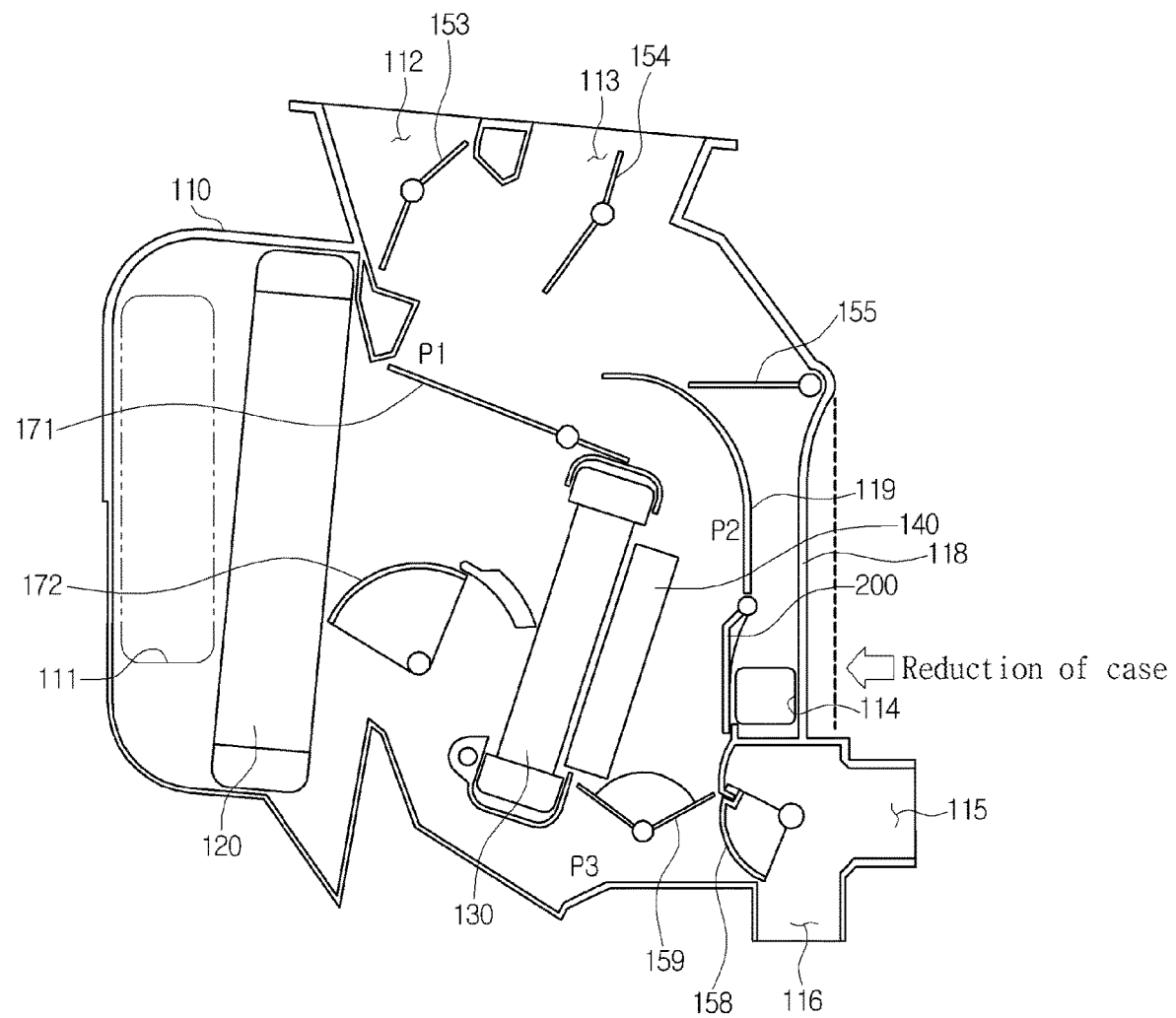
FIG. 9 is a sectional view showing an air conditioner for a vehicle according to a second preferred embodiment of the present invention.
Figure 10:
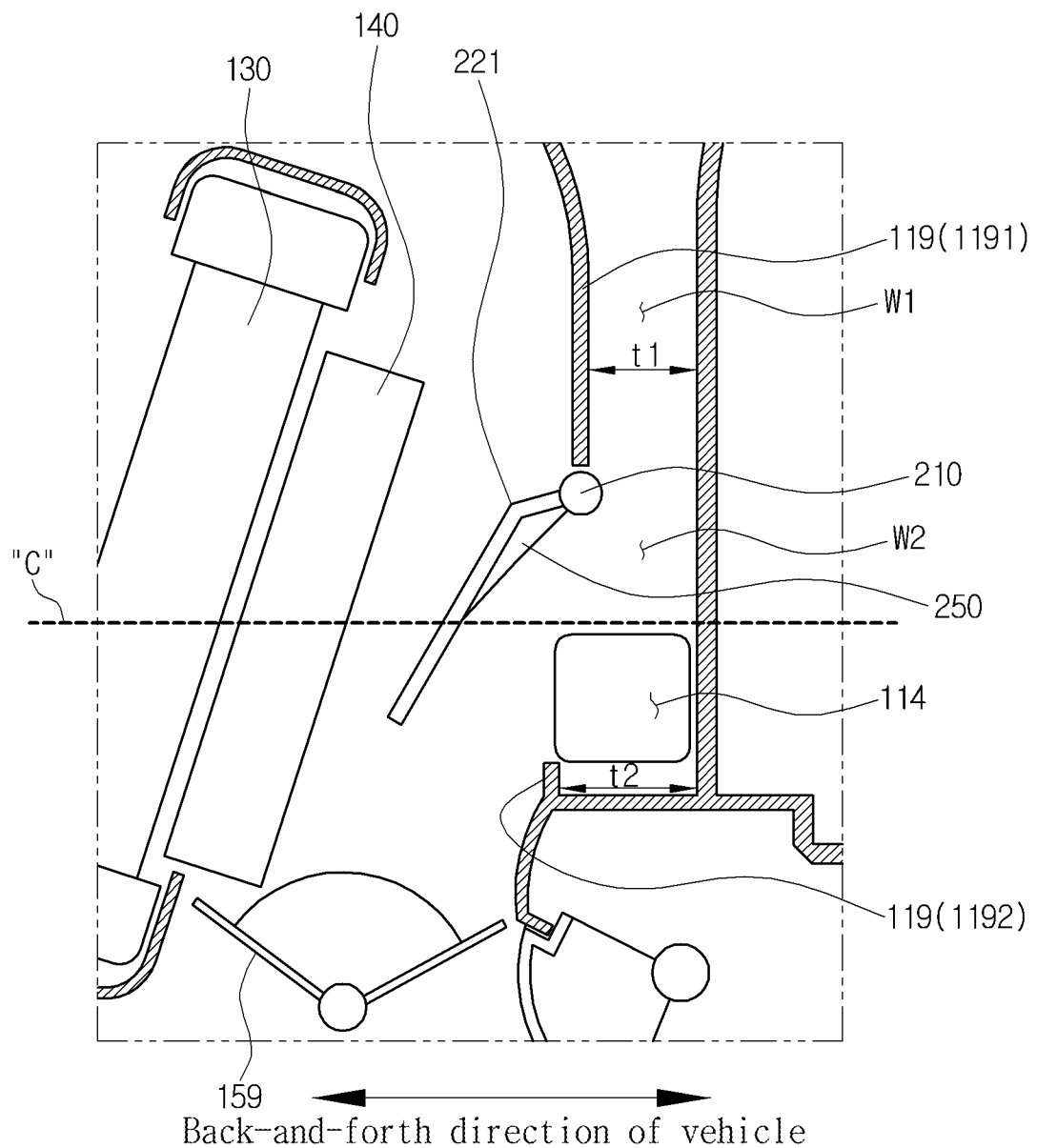
FIG. 10 is a partially enlarged sectional view of FIG. 9.
Figure 11:
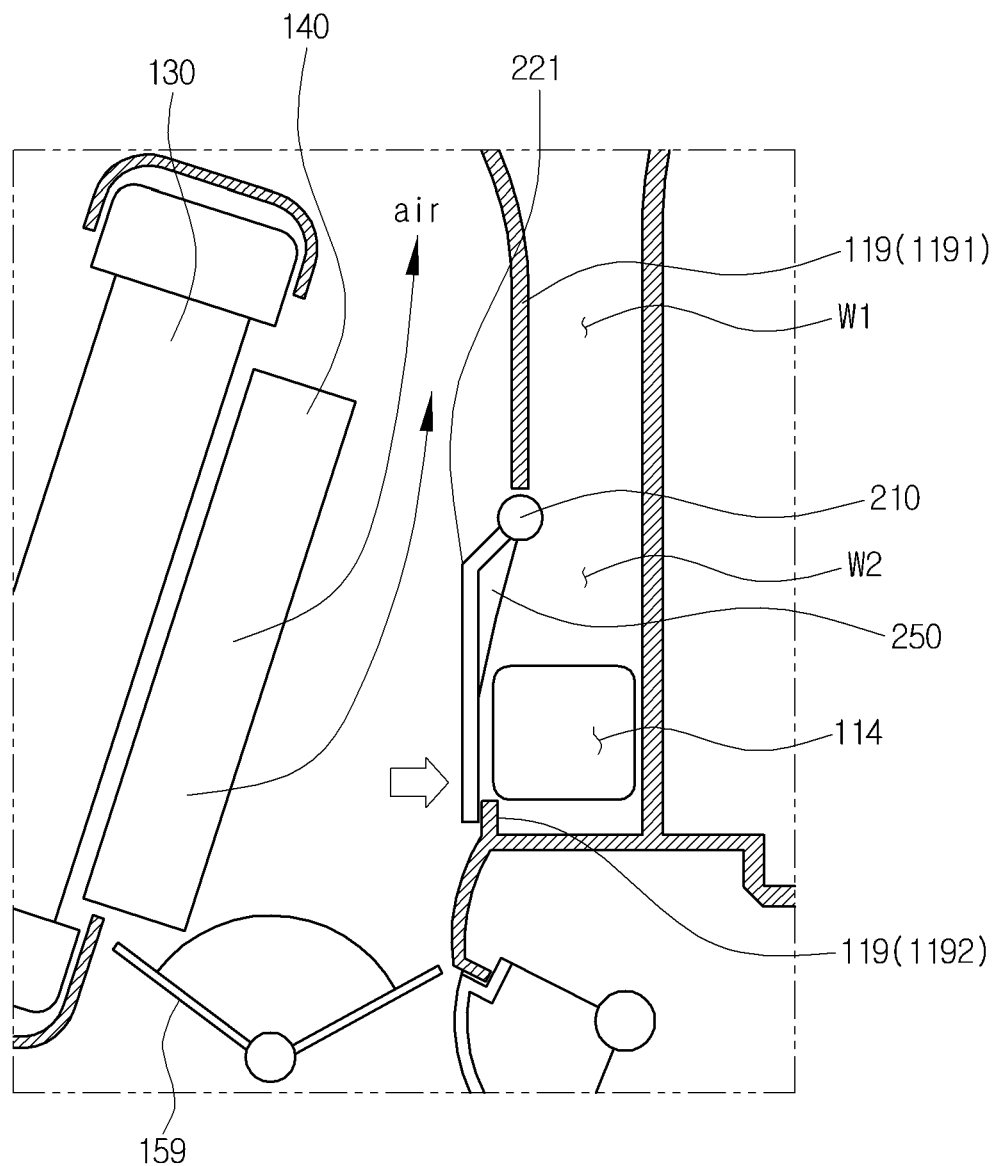
FIGS. 11 and 12 are sectional views showing an operation of the air conditioner for a vehicle of FIG. 10.
Figure 12:
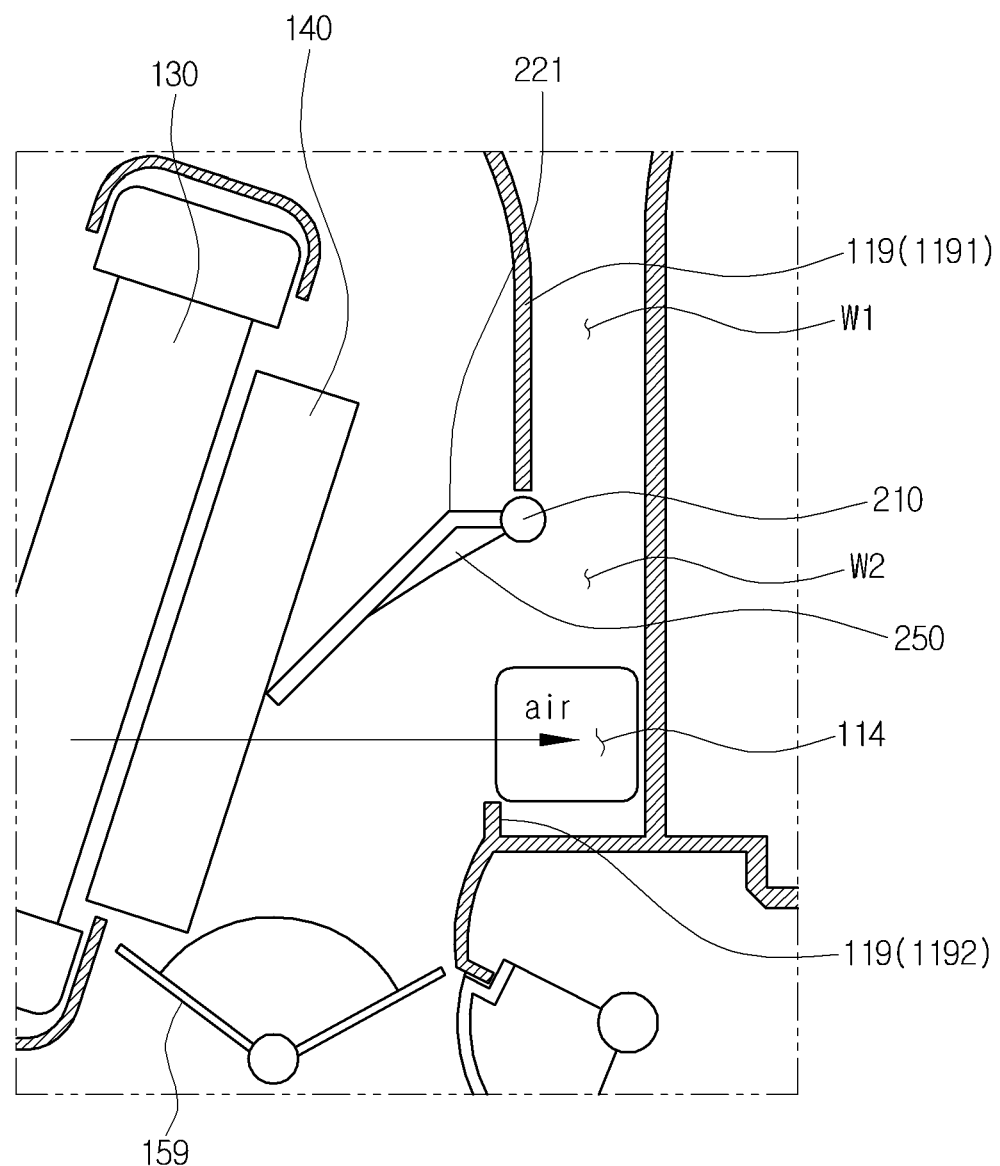

In the meantime, FIG. 9 is a sectional view showing an air conditioner for a vehicle according to a second preferred embodiment of the present invention, FIG. 10 is a partially enlarged sectional view of FIG. 9, and FIGS. 11 and 12 are sectional views showing an operation of the air conditioner for a vehicle of FIG. 10.

Referring to FIGS. 9 to 12, the air conditioner for a vehicle according to the second preferred embodiment of the present invention includes an air-conditioning case 110, an evaporator 120, a heater core 130, an electric heater 140, a warm air bypass passageway 201, and a warm air bypass door 200. In the second preferred embodiment, duplicated description of the structures described in the first preferred embodiment will be omitted, and structures different from the first preferred embodiment will be described in detail.

The warm air bypass door 200 includes a rotary shaft 210 and a plate 220, and the plate 220 has a bent portion 221 to have at least two sides. Moreover, the air-conditioning case 110 has a passageway facing the front seat floor vent and a partition wall 119 for separating the warm air passageway P2 from the passageway facing the front seat floor vent. The partition wall 119 vertically extends at approximately right angles, and the passageway facing the front seat floor vent is formed to have a relatively uniform width between the partition wall 119 and a rear surface 118 of the air-conditioning case 110.

The passageway facing the front seat floor vent includes a first passageway W1 and a second passageway W2. The first passageway W1 is formed upstream from the rotary shaft 210 of the warm air bypass door 200, and the second passageway W2 is formed downstream from the rotary shaft 210 of the warm air bypass door 200. The second passageway W2 is larger in a cross section area than the first passageway W1.

In detail, the rotary shaft 210 of the warm air bypass door 200 is arranged above the center of the heat exchanger for heating in a vertical direction. That is, the rotary shaft 210 of the warm air bypass door 200 is located above a center line C of the heater core 130 and the electric heater 140. Furthermore, the front seat floor vent 114 is arranged below the center line C of the heat exchanger for heating in the vertical direction.

Through the above structure, the air passing the heater core 130 and the electric heater 140 flows toward an outlet of the front seat floor vent 114 in a straight line in order to increase the air volume toward the front seat floor vent 114.

In more detail, the partition wall 119 includes a first partition wall 1191 for separating the warm air passageway P2 from the first passageway W1 and a second partition wall 1192 for separating the warm air passageway P2 from the second passageway W2. A width t2 between the rear surface 118 of the air-condition case 110 and the second partition wall 1192 is wider than a width t1 between the rear surface 118 of the air-conditioning case 110 and the first partition wall 1191. The front seat floor vent 114 is formed in the second passageway W2.

The warm air bypass door 200 has the bent portion 221 to have a stepped portion, so that a cross-sectional area of the second passageway W2 is larger than that of the first passageway W1 and the outlet of the front seat floor vent 114 can be maximized. The structure that the cross-sectional area of the passageway facing the front seat floor vent is increased at the outlet of the front seat floor vent 114 makes the outlet of the front seat floor vent 114 wider than the structure that the passageway facing the front seat floor vent has the uniform cross-sectional area. Therefore, the air conditioner for a vehicle according to the second preferred embodiment of the present invention can enhance heating performance by increasing the warm air volume toward the front seat floor vent 114.

Additionally, because the warm air bypass door 200 includes the bent portion 221 and the rotary shaft 210 arranged above the front seat floor vent 114, the air conditioner for a vehicle according to the second preferred embodiment of the present invention can secure the cross-sectional area of the outlet of the front seat floor vent 114 and reduce the back-and-forth width of the air-conditioning case 110. That is, as shown in FIG. 9, the air-conditioning case may have a compact size since the rear surface 118 of the air-conditioning case 110 is reduced to the left, namely, in the front direction of the vehicle or in the inward direction of the vehicle.

In addition, the warm air bypass door 200 includes an intensity strengthening rib 250. The intensity strengthening rib 250 is formed at the opposite side to an air introducing part of the warm air bypass passageway 201. That is, the intensity strengthening rib 250 is formed inside the bent portion 221 of the warm air bypass door 200 to connect the first side and the second side of the plate with each other. As described above, because the intensity strengthening rib 250 is formed inside the warm air bypass door 200, the air conditioner for a vehicle according to the second preferred embodiment of the present invention can strengthen intensity and minimize interruption to the air flow since the intensity strengthening rib 250 does not protrude into the air flow channel.

Figure 13:
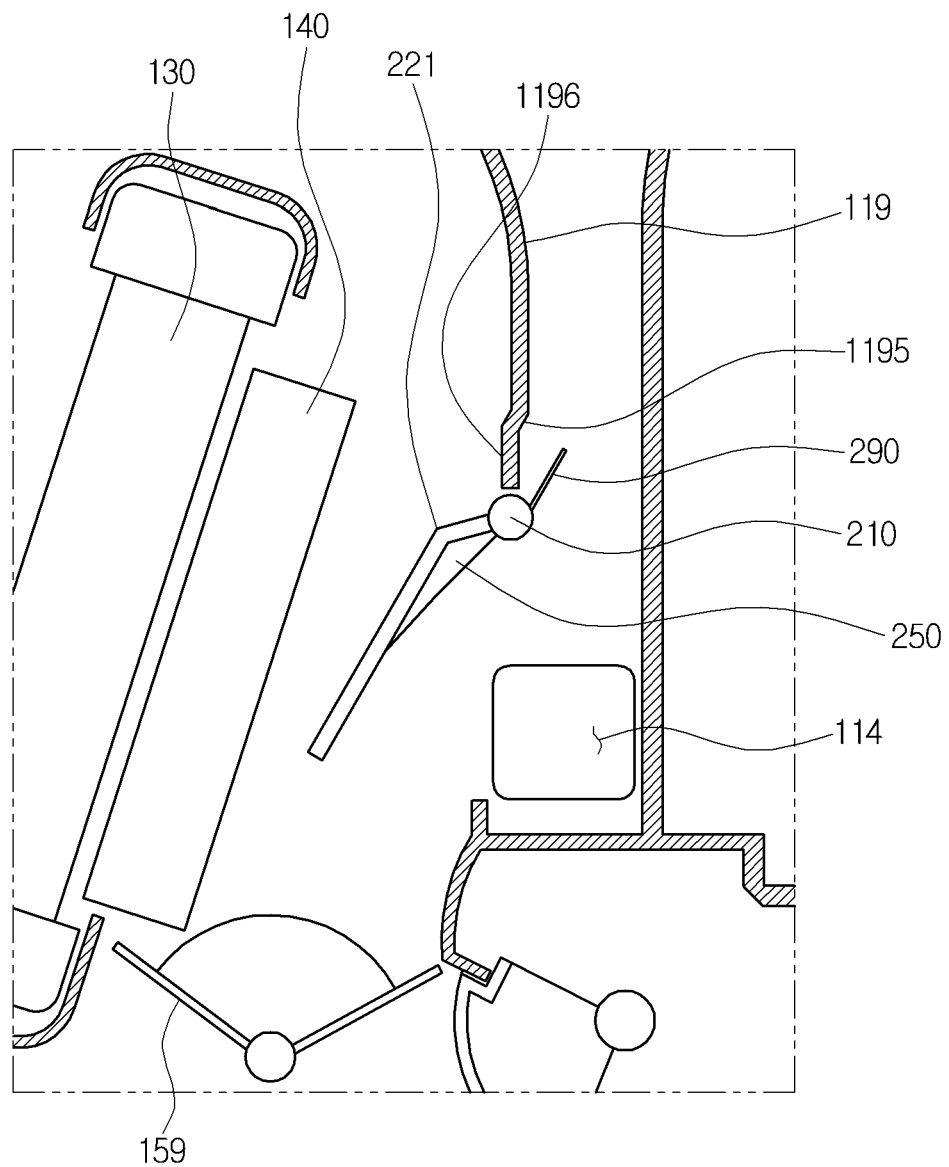
FIG. 13 is a partially sectional view showing an air conditioner for a vehicle according to a third preferred embodiment of the present invention.
Figure 14:
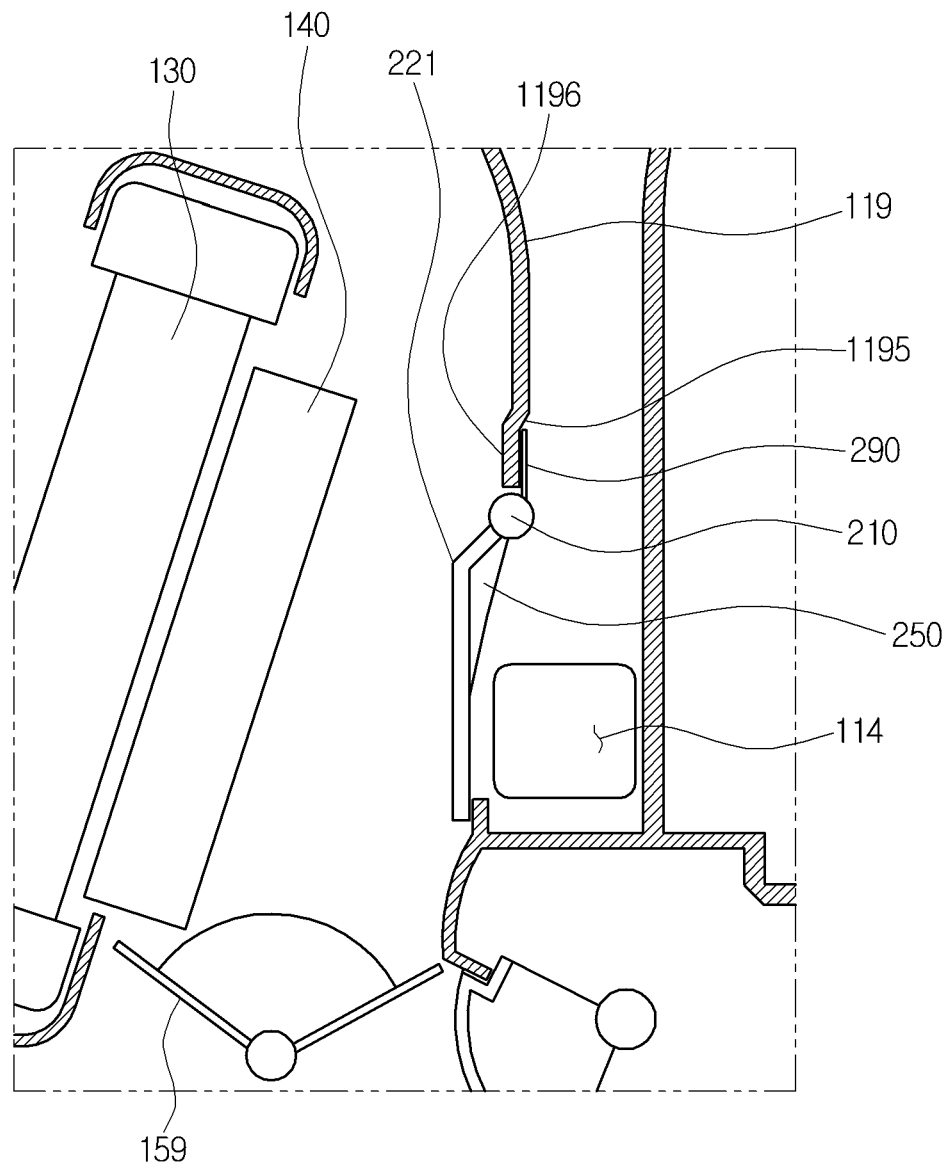
FIG. 14 is a sectional view showing an operation of the air conditioner for a vehicle of FIG. 13.

FIG. 13 is a partially sectional view showing an air conditioner for a vehicle according to a third preferred embodiment of the present invention, and FIG. 14 is a sectional view showing an operation of the air conditioner for a vehicle of FIG. 13.

Referring to FIGS. 13 and 14, a stopper part 290 is formed at the rotary shaft 210 of the warm air bypass door 200. The stopper part 290 is to perform sealing between the air-conditioning case 110 and the warm air bypass door 200, is made of a soft material, such as rubber, and protrudes from the rotary shaft 210 in the radial direction. The stopper part 290 gets in contact with the partition wall 119 for separating the warm air passageway from the front seat floor vent so as to serve as a stopper for restricting a rotation angle of the warm air bypass door 200 and to perform a sealing function.

The stopper part 290 is formed at the opposite side to the air introducing part of the warm air bypass passageway 201 but does not protrude into the air passageway. Moreover, the partition wall 119 for separating the warm air passageway from the front seat floor vent has a stepped portion 1195. The stepped portion 1195 is formed at an end portion 1196 of the partition wall 119 to be inclined. The passageway facing the front seat floor vent gets wider from an upper portion to a lower portion by the stepped portion 1195. The stepped portion 1195 provides a space to seat the stopper part 290 when the warm air bypass door 200 is rotated.

Through the above structure, the warm air bypass door 200 can perform the stopper function and sealing function, and the stopper part 290 does not protrude so as not to interrupt the flow of the air passageway. Additionally, due to the stepped portion 1195, the stopper part 290 does not protrude into the air passageway, and the air conditioner can be designed intensively without any interference between the stopper part 290 and the partition wall 119 of the air-conditioning case.

While the present invention has been particularly shown and described with reference to exemplary embodiments thereof, it will be understood by those of ordinary skill in the art that various modifications and equivalents may be made without deviating from the spirit or scope of the invention. Therefore, it would be understood that the technical and protective scope of the present invention shall be defined by the technical idea as defined by the following claims and the equivalences.

What is claimed is:

1. An air conditioner for a vehicle comprising an air-conditioning case,
    an evaporator for cooling an air introduced into an air inlet formed in the air-conditioning case and a heater core for heating the air,
    an air passageway composed of a front seat cold air passageway, a warm air passageway, and a rear seat cold air passageway inside the air-conditioning case,
    air outlets composed of a defrost vent, a front seat face vent, a front seat floor vent, a rear seat face vent and a rear seat floor vent, and
    a front seat temp door adjusting an opening degree of the air passageways,
    wherein a warm air bypass passageway for directly discharging the air passing a heat exchanger for heating to a front seat floor vent;
    a warm air bypass door for adjusting the degree of opening of the warm air bypass passageway, and
    wherein the warm air bypass door includes a rotary shaft and a plate, and the plate has a bent portion to have at least two sides.

2. The air conditioner according to claim 1, wherein the plate has two sides inclined on the basis of the bent portion.

3. The air conditioner according to claim 1, wherein the warm air bypass passageway is formed in a partition wall for separating the warm air passageway from the front seat floor vent.

4. The air conditioner according to claim 1, wherein the rotary shaft of the warm air bypass door is formed above an outlet of the front seat floor vent.

5. The air conditioner according to claim 1, wherein a passageway facing the front seat floor vent includes a first passageway arranged upstream from the rotary shaft of the warm air bypass door and a second passageway arranged downstream from the rotary shaft, and
    wherein the second passageway is larger in cross-sectional area than the first passageway.

6. The air conditioner according to claim 5, wherein a partition wall includes a first partition wall for separating the warm air passageway from the first passageway and a second partition wall for separating the warm air passageway from the second passageway, and
    wherein a width between the rear surface of the air-condition case and the second partition wall is wider than a width between the rear surface of the air-conditioning case and the first partition wall, and the front seat floor vent is formed in the second passageway.

7. The air conditioner according to claim 1, wherein the rotary shaft of the warm air bypass door is vertically arranged above the center of the heat exchanger for heating, and
    wherein the front seat floor vent is vertically arranged below the center of the heat exchanger for heating.

8. The air conditioner according to claim 1, wherein the warm air bypass door includes an intensity strengthening rib, and the intensity strengthening rib is formed at the opposite side to an air introducing part of the warm air bypass passageway.

9. An air conditioner for a vehicle which includes an air-conditioning case,
    an evaporator for cooling an air introduced into an air inlet formed in the air-conditioning case and a heater core for heating the air,
    an air passageway composed of a front seat cold air passageway, a warm air passageway, and a rear seat cold air passageway inside the air-conditioning case,
    air outlets composed of a defrost vent, a front seat face vent, a front seat floor vent, a rear seat face vent and a rear seat floor vent, and
    a front seat temp door adjusting an opening degree of the air passageways,
    wherein a warm air bypass passageway for directly discharging the air passing a heat exchanger for heating to a front seat floor vent;
    a warm air bypass door for adjusting the degree of opening of the warm air bypass passageway; and
    a control unit for linking and controlling a defrost door, which adjusts the degree of opening of a defrost vent, and the warm air bypass door.

10. The air conditioner according to claim 9, wherein the control unit controls to differently compensate the degree of opening of the defrost door depending on opening or closing conditions of the warm air bypass door.

11. The air conditioner according to claim 10, wherein the control unit controls the warm air bypass door to open the warm air bypass passageway only when a driver's seat and a passenger's seat are all in the maximum heating state and the driver's seat and the passenger's seat are all in a front seat floor mode.

12. The air conditioner according to claim 11, wherein the control unit controls the degree of opening of the defrost door in the opening condition of the warm air bypass door to be more than that in the closing condition.

13. The air conditioner according to claim 9, further comprising:
    an upper flow channel and a lower flow channel for individually controlling air-conditioning of a front seat and a rear seat of the vehicle.

14. The air conditioner according to claim 9, further comprising:
    a front seat temp door for adjusting the degree of opening between a front seat cold air passageway and a part of a warm air passageway;
    a first rear seat temp door arranged between the heat exchanger for cooling and the heat exchanger for heating to adjust the degree of opening of another part of the warm air passageway;
    a rear seat mode door for adjusting the degree of opening of a rear seat air outlet; and
    a second rear seat temp door arranged downstream of the heat exchanger for heating to adjust the degree of opening between the warm air passageway and a rear seat cold air passageway.

15. The air conditioner according to claim 9, wherein the warm air bypass door blocks a flow channel of a warm air passageway when the warm air bypass passageway is opened, so as to guide some of the air flowing in the warm air passageway toward the front seat floor vent.

16. The air conditioner according to claim 9, wherein an opening direction of the warm air bypass door is opposite to an air flow direction.

17. The air conditioner according to claim 1, wherein an opening direction of the warm air bypass door is opposite to an air flow direction.

18. The air conditioner according to claim 17, wherein the opening direction of the warm air bypass door is a direction to face the heat exchanger for heating.

19. The air conditioner according to claim 1, wherein the warm air bypass door blocks a flow channel of the warm air passageway when the warm air bypass passageway is opened, so as to guide some of the air flowing in the warm air passageway toward the front seat floor vent.

20. The air conditioner according to claim 1, further comprising:
- a front seat temp door for adjusting the degree of opening between a front seat cold air passageway and a part of the warm air passageway;
- a first rear seat temp door arranged between a heat exchanger for cooling and the heat exchanger for heating to adjust the degree of opening of another part of the warm air passageway;
- a rear seat mode door for adjusting the degree of opening of a rear seat air outlet; and
- a second rear seat temp door arranged downstream of the heat exchanger for heating to adjust the degree of opening between the warm air passageway and a rear seat cold air passageway.

21. The air conditioner according to claim 1, further comprising:
- an upper flow channel and a lower flow channel for individually controlling air-conditioning of a front seat and a rear seat of the vehicle.

22. The air conditioner according to claim 1, wherein the warm air bypass door has a stopper part formed on the rotary shaft to perform sealing between the warm air bypass door and the air-conditioning case.

23. The air conditioner according to claim 22, wherein the stopper part is formed in the opposite side to the air introducing part of the warm air bypass passageway and does not protrude into the air passageway.

24. The air conditioner according to claim 22, wherein a stepped portion is formed on a partition wall for separating a warm air passageway from the front seat floor vent so that the stopper part is seated on the stepped part when the warm air bypass door is rotated.

* * * * *